United States Patent [19]
Li

[11] Patent Number: 5,744,790
[45] Date of Patent: Apr. 28, 1998

[54] SPLIT OPTICS FOCUSING APPARATUS FOR CCD-BASED BAR CODE SCANNER

[75] Inventor: Yajun Li, Oakdale, N.Y.

[73] Assignee: Symbol Technologies, Inc., Holtsville, N.Y.

[21] Appl. No.: 591,099

[22] Filed: Jan. 25, 1996

[51] Int. Cl.$^6$ .................................................. G06K 7/10
[52] U.S. Cl. .......................... 235/472; 235/462; 250/568; 250/201.4
[58] Field of Search ................... 235/462, 472; 359/629; 250/205, 568, 201.4; 356/153

[56] References Cited

U.S. PATENT DOCUMENTS

| | | |
|---|---|---|
| 4,251,798 | 2/1981 | Swartz et al. . |
| 4,369,361 | 1/1983 | Swartz et al. ............................ 235/470 |
| 4,387,297 | 6/1983 | Swartz et al. ............................ 235/462 |
| 4,409,470 | 10/1983 | Shepard et al. .......................... 235/472 |
| 4,760,248 | 7/1988 | Swartz et al. ............................ 235/472 |
| 4,820,911 | 4/1989 | Arackellian et al. ..................... 235/467 |
| 4,877,949 | 10/1989 | Danielson et al. ....................... 235/462 |
| 4,896,026 | 1/1990 | Krichever et al. ....................... 235/472 |
| 4,897,832 | 1/1990 | Swartz et al. ............................ 235/472 |
| 5,192,856 | 3/1993 | Schaham .................................. 235/462 |
| 5,206,491 | 4/1993 | Katoh et al. ............................. 235/462 |
| 5,210,398 | 5/1993 | Metlitsky ................................. 235/462 |
| 5,243,655 | 9/1993 | Wang ....................................... 380/51 |
| 5,304,786 | 4/1994 | Pavlidis et al. ......................... 235/462 |
| 5,347,121 | 9/1994 | Rudeen .................................... 235/472 |
| 5,359,185 | 10/1994 | Hanson ................................... 235/472 |
| 5,442,164 | 8/1995 | Adachi .................................... 235/462 |
| 5,500,516 | 3/1996 | Duron ..................................... 235/472 |
| 5,521,366 | 5/1996 | Wang et al. ............................. 235/472 |
| 5,534,684 | 7/1996 | Danielson ............................... 235/472 |

FOREIGN PATENT DOCUMENTS

| | | | |
|---|---|---|---|
| 425274 | 5/1991 | European Pat. Off. ............. | 235/462 |
| 67692 | 3/1988 | Japan . | |
| 083999 | 2/1994 | Japan ................................ | 235/472 |

*Primary Examiner*—Donald T. Hajec
*Assistant Examiner*—Douglas X. Rodriguez

[57] ABSTRACT

A bar code scanner comprises a radiant energy source for generating a radiant energy beam of a given configuration, a detector for generating output electrical signals indicative of radiant energy incident thereon, an optical system having a focus portion for transmitting segments of the radiant energy beam in separate optical paths extending from the scanner to a bar code to be scanned and a scan portion for collecting radiant energy transmitted by the focus portion as modified by the bar code and applying the same to the detector and a decoder for decoding the output electrical signals of the detector to provide indication of information contained in the bar code.

35 Claims, 12 Drawing Sheets

SPLIT OPTICS FOCUSING APPARATUS FOR CCD-BASED BAR CODE SCANNER

BACKGROUND OF THE INVENTION

1. Field of the Invention

The present invention relates generally to bar code scanners and more particularly pertains to CCD-based bar code scanners and to focusing apparatus and to methods of focusing.

2. Description of the Related Art

Various optical readers and optical scanning systems have been developed heretofore for reading bar code symbols appearing on a label or on the surface of an article. The bar code symbol itself is a coded pattern of indicia comprised of a series of bars of various widths spaced apart from one another to bound spaces of various widths, the bars and spaces having different light reflecting characteristics. The readers and scanning systems electro-optically transform the graphic indicia into electrical signals, which are decoded into alphanumeric characters that are intended to be descriptive of the article or some characteristic thereof. Such characters are typically represented in digital form and utilized as an input to a data processing system for applications in point-of-sale processing, Inventory control, and the like scanning systems of this general type have been disclosed, for example, in U.S. Pat. Nos. 4,251,798; 4,369, 361; 4,387,297, 4,409,470; 4,760,248; and 4,896,026, all of which have been assigned to the same assignee as the instant application.

As disclosed in some of the above patents, one embodiment of such a scanning system resides, inter alia, in a hand-held, portable scanning head supported by a user, which is configured to allow the user to aim the head, and more particularly, a light beam, at a target and a symbol to be read.

Bar code symbols are formed from bars or elements that are typically rectangular in shape with a variety of possible widths. The specific arrangement of elements defines the character represented according to a set of rules and definitions specified by the code or "symbology" used. The relative size of the bars and spaces is determined by the type of coding used, as is the actual size of the bars and spaces. The number of characters per inch represented by the bar code symbol is referred to as the density of the symbol. To encode a desired sequence of characters, element arrangements are concatenated together to form the complete bar code symbol, with each character of the message being represented by its own corresponding group of elements. In some symbologies a unique "start" and "stop" character is used to indicate where the bar code begins and ends. A number of different bar code symbologies exist. These symbologies include UPC/EAN, Code 39, Code 128, Codabar, and Interleaved 2 of 5.

A further known symbology is known as two-dimensional (2D) symbology and is discussed in detail in commonly-assigned U.S. Pat. Nos. 5,243,655 and 5,304,786, which are incorporated herein by this reference thereto. Briefly, that symbology involves a variable number of component symbols or "codewords" per row of a nonvolatile electro-optical read-only memory imprinted on a subs-rate. Codewords in alternating rows are selected from mutually exclusive subsets of a mark pattern, the subsets being defined in terms of particular values of a discriminator function which is illustrated in the referenced patents as being a function of the widths of bars and spaces in a given codeword.

In the scanning systems known in the art, the light beam is directed by a lens or similar optical components along a light path toward a target that includes a bar code symbol on the surface. The scanning systems function by repetitively scanning the light beam in a line or series of lines across the symbol. The scanning component may either sweep the beam spot across the symbol and trace a scan line across the past the symbol, or scan the field of view of the scanner, or do both.

Scanning systems also include a sensor or photodetector which functions to detect light reflected from the symbol. The photodetector is therefore positioned in the scanner or in an optical path in which it has a field of view which extends across and slightly past the symbol. A portion of the reflected light which is reflected off the symbol is detected and converted into an electrical signal, and electronic circuitry or software decodes the electrical signal into a digital representation of the data represented by the symbol that has been scanned. For example, the analog electrical signal from the photodetector may typically be converted into a pulse width modulated digital signal, with the widths corresponding to the physical widths of the bars and spaces. Such a signal is then decoded according to the specific symbology into a binary representation of the data encoded in the symbol, and to the alphanumeric character so represented.

The decoding process in known scanning systems usually works in the following way. The decoder receives the pulse width modulated digital signal from the scanner, and an algorithm implemented in software attempts to decode the scan. If the start and stop characters and the characters between them in the scan were decoded successfully and completely, the decoding process terminates and an indicator of a successful read (such as a green light and/or an audible beep) is provided to the user. Otherwise, the decoder receives the next scan, performs another decode attempt on that scan, and so on, until a completely decoded scan is achieved or no more scans are available.

Such a signal is then decoded according to the specific symbology into a binary representation of the data encoded in the symbol, and to the alphanumeric characters so represented.

Decoding in 2D symbology is discussed particularly and shown in various flow charts set forth in the 2D symbology patents incorporated by reference and above identified.

Another type of bar code reader is one which incorporates a detector based upon charge coupled device (CCD) technology. CCDs are an array of many detectors. The entire symbol is flooded with light from the reader or ambient light, and each CCD detector is sequentially read out to determine the presence of a bar or a space. Such readers are light-weight and easy to use, but require substantially direct contact or placement of the reader on the symbol to enable the symbol to be properly read. Such physical contact of the reader with the symbol is a preferred mode of operation for many applications, or as a matter of personal preference by the user.

The working range of an optical scanner is determined by many factors, e.g., the depth of focus of the scanning laser beam, receiving optics, electronics and decode algorithm, etc.

Efforts have heretofore been made to provide an optical scanner and method of scanning with an extended depth of focus, e.g., as in U.S. Pat. No. 5,210,398, which issued on May 11, 1993, and is assigned to the same assignee as the instant application.

Other efforts have heretofore been made to include, in optical scanners, various apparatus for effecting focusing, particularly on an automated basis.

One approach is found in U.S. Pat. No. 5,359,185, which discloses an apparatus for focusing an image of optical information over a substantial range of distances, comprising optical means for refracting images of optical information of varying wavelengths to different focal points along a longitudinal axis at a predetermined reading position, illuminating means for sequentially illuminating optical information with light of different wavelength, reading sensor means, disposed at the predetermined reading position and having a light receiving plane for converting an image of optical information into an electrical signal, and control means for determining and decoding the reflected light image formed by that wavelength of light from the illuminating means which produces the best focus.

A further prior art endeavor is seen in U.S. Pat. No. 5,192,856, which discloses an apparatus for use in reading a bar code along a scan axis at a distance from a target, the apparatus comprising an electromagnetic signal source for providing an electromagnetic illumination beam at a selected frequency and intensity, an optical train including fixed beam shaping optics for receiving and spreading the illumination beam to exit a housing port and irradiating the bar code completely along the scan axis with the housing at a single position relative to the target and auto-focusing optics for receiving a reflected beam from the bar code and adjusting the focal point of the reflected beam exiting therefrom. A motor is provided for adjusting the position of the auto-focusing optics in dependence on received control signals. A sensor receives the focused reflected beam from the auto-focusing optics and provides electrical signal equivalents thereof. A processor receives the reflected beam electrical signal equivalents, and first generates the auto-focusing optics con-rod signals in accordance with a method comprising the steps of detecting maximum and minimum signal magnitudes in the signal equivalents, digitizing the maximum and minimum signal magnitudes in the signal equivalents, computing a contrast value for -he maximum and minimum signal magnitudes in the signal equivalents, and generating the control signals to move the auto-focusing optics by an amount inversely proportional to the magnitude of the computed contrast value. The processor means repeats the method until the control signals have a minimum value wherein the difference between the contrast value and a previously computed contrast value is less than a preselected value and wherein the contrast value is greater than a threshold value.

A still further prior art effort is seen in U.S. Pat. No. 4,877,949, which discloses a bar code reader system comprising bar code sensor means for generating an output signal in accordance with a bar code image incident thereon, distance measurement means for automated reading of distances of a bar code from a hand-held bar code reader over a measurement range which exceeds an operative range for reading of bar codes, reading distance adaptation means for automatically adapting the reader to the reading of a bar code at varying distances therefrom within the operative range by causing an image of the bar code to be substantially focused at the image sensor means, enabling means for enabling a bar code reading operation, and control means coupled with the enabling means and the distance measuring means and operative in response to enabling of a bar code reading operation by the enabling means and in response to reading by the distance measurement means of distances within the operative range for automatically controlling the reading distance adaptation means during movement of the reader relative to a bar code within the operative range to tend to establish and maintain a focused bar code image at the image sensor means.

The above noted schemes for automatic focusing in bar code scanners are seen as unduly complex and costly.

A primary object of the present invention is therefore to provide an optical scanner and method of scanning bar codes which involve simplified focusing apparatus and practices.

SUMMARY OF THE INVENTION

In accordance with the teachings herein, the present invention provides a bar code scanner comprising radiant energy source means for generating a radiant energy beam of a given configuration, detector means for generating output electrical signals indicative of radiant energy incident thereon, an optical system having a focus portion for transmitting segments of the radiant energy beam in separate optical paths extending from the scanner to a bar code to be scanned and a scan portion for collecting radiant energy transmitted by the radiant energy transmitting means as modified by the bar code and applying the same to the detector means, and decoder means for decoding output electrical signals of the detector means to provide indication of information contained in the bar code.

In one method aspect, the invention provides a method for use in bar code scanning comprising the steps of generating a radiant energy beam with a given geometric configuration, segmenting the generated radiant energy beam into segments, projecting the segments of the generated radiant energy beam onto the bar code, moving a scanner housing, wherein the generating and segmenting steps are practiced, relative to the bar code and discontinuing moving the scanner housing when it is moved into a position wherein the segments form, on the bar code, the generated radiant energy beam in its given geometric configuration.

The method includes the further step of scanning the bar code when the scanner housing at the position at which the bar code exhibits the generated radiant energy beam in its given geometric configuration. The scanning step may be practiced with ambient, environmental light, or through the use of a second radiant energy source energized following such movement of the scanner housing.

In another method aspect, the invention provides a method including the steps of generating a radiant energy beam, defining a first optical path for the generated radiant energy beam, projecting the generated radiant energy beam into the first optical path, obtaining a focus condition for the bar code based on the generated radiant energy beam as projected into the first optical path, defining a second optical path for ambient, environmental radiant energy incident on the bar code and scanning the bar code in the focus condition thereof by detecting ambient, environmental radiant energy incident on the bar code in the second optical path. Alternatively, the method may be practiced by providing a radiant energy for scanning and projecting the scanning beam into the second optical path.

BRIEF DESCRIPTION OF THE DRAWINGS

The foregoing objects and advantages of the present invention may be more readily understood by one skilled in the art with reference being had to the following detailed description of preferred embodiments thereof, taken in conjunction with the accompanying drawings wherein like elements are designated by identical reference numerals throughout the several views, and in which.

DETAILED DESCRIPTION OF PREFERRED EMBODIMENTS AND PRACTICES

Figure 1:
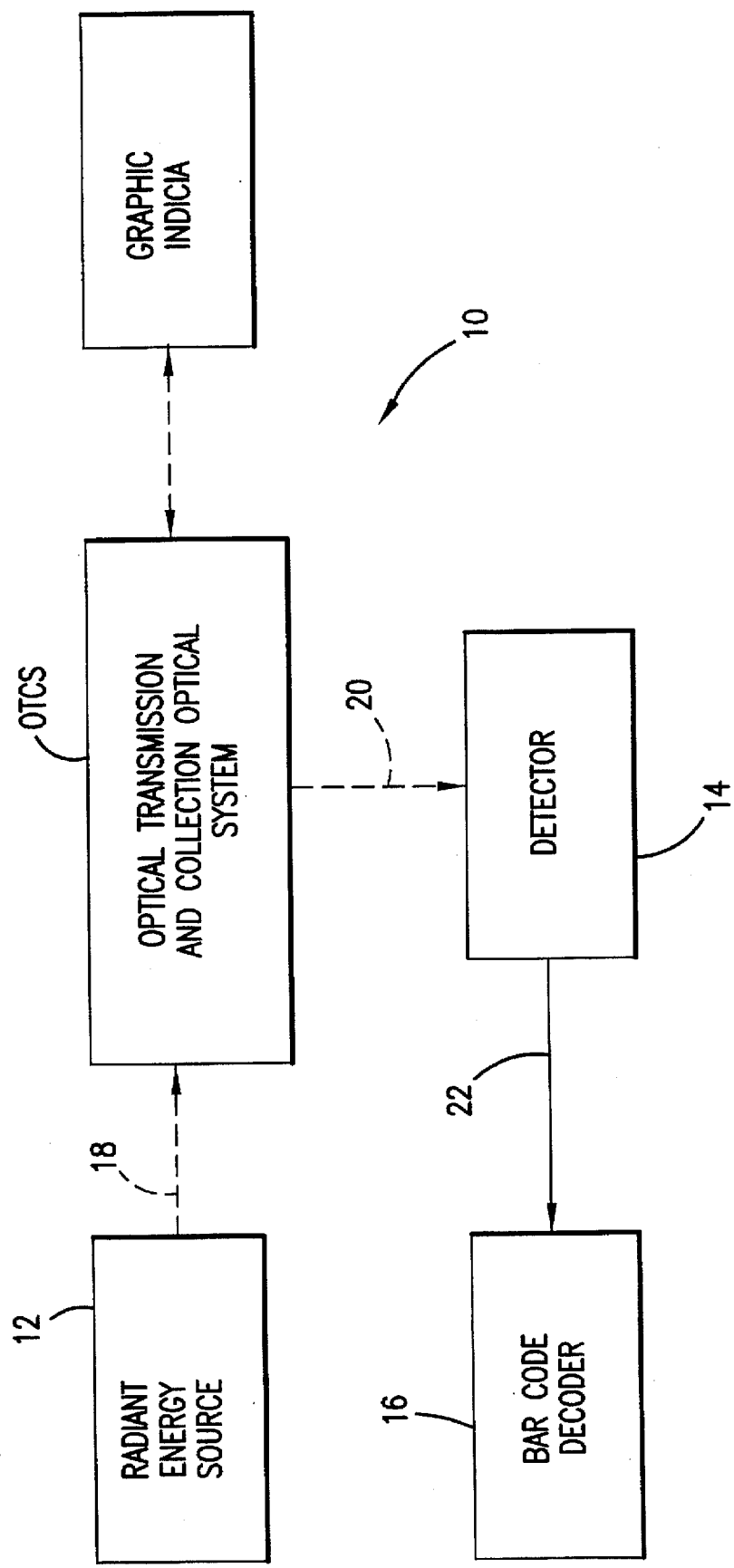
FIG. 1 is a general functional block diagram of components of a scanner in accordance with the invention.

Referring to FIG. 1, scanner 10 includes radiant energy source 12, an optical transmission and collection system (OTCS) discussed below, radiant energy detector 14 and bar code decoder 16. Source 12 and detector 14 communicate with the OTCS (hereinafter, the "optical system") as indicated by optical paths 18 and 20 and lines 22 furnish detector output signals to decoder 16. The optical system has as its object a bar code or the like, indicated in FIG. 1 as GRAPHIC INDICIA.

Source 12 may be constituted by a light-emitting diode (LED) (shown in FIG. 2 as 12a) or other known radiant energy source. Detector 14 preferably comprises a CCD array, but may be constituted by photocells or other known radiant energy detectors. Decoder 16 may be constituted by a microcomputer, programmed as set forth in the patents above referenced in the cited prior art patents, to decode the symbology of the bar code being addressed by the scanner.

Figure 2:
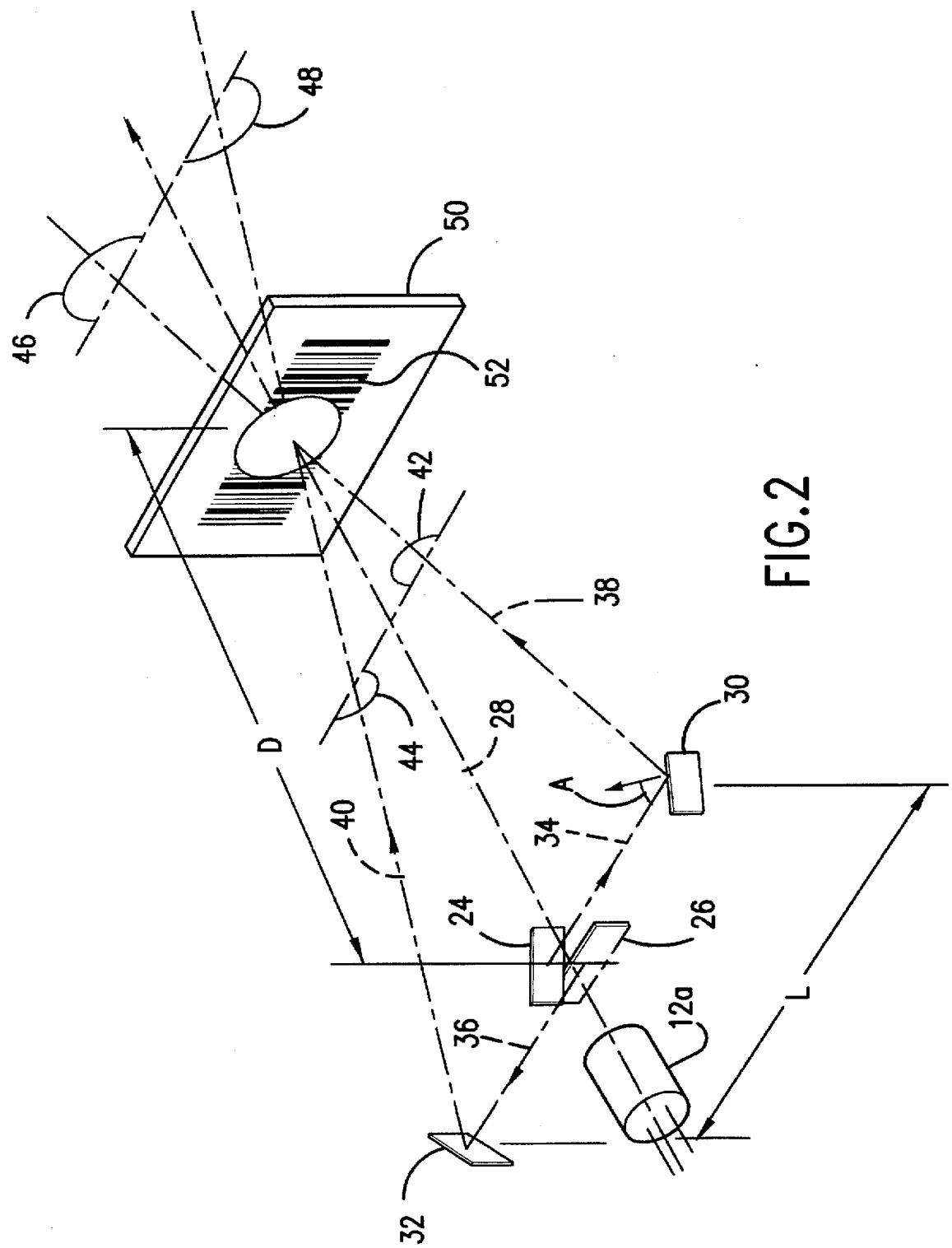
FIG. 2 shows a first embodiment of a focus portion of an optical system in accordance with the invention.

Turning to FIG. 2, the focus portion of the optical system has first and second mirrors 24 and 26, which are in registry with segments of the radiant energy issuing from LED 12a. In the illustrated arrangement, LED 12a provides an output beam which is circular in configuration and mirror 24 is in registry with the upper half-circle of the output beam and mirror 26 is in registry with the lower half-circle of the output beam. As is discussed hereinafter, the geometric configuration of the radiant energy source output beam is generally not of consequence in practicing the invention.

Mirrors 24 and 26 are fixedly disposed in the scanner, as is the radiant energy source 12a. Mirror 24 is disposed to reflect the LED upper half-circle output beam orthogonally of optical axis 28 onto mirror 30. Mirror 26 is disposed to reflect the LED lower half-circle output beam orthogonally of optical axis 28 onto mirror 32, i.e., oppositely of the energy reflected by mirror 24, the reflective paths 34 and 36 being in alignment orthogonally of optical axis 28 as viewed from above and each mirror having an angle of inclination (A) relative to alignment paths 34 and 36.

Further reflective paths 38 and 40, respectively of mirrors 30 and 32, will be seen to contain smaller (42, 44) and larger (46, 48) images of the half-circles as distance progresses along optical axis 28. A one location along the optical axis, however, the respective upper and lower half-circle images will be in planar registry, i.e., at target or object plane 50, which is the focal plane of the focus portion of the optical system. A bar code 52 resident in plane 50 will accordingly be in focus for a scan portion of the optical system as is discussed hereinafter.

The distance D between plane 50 and the centerlines of mirrors 24 and 26 is defined by the relationship:

$$D=(L/2)\tan(2A)$$

where L is the distance between the vertical centerlines of mirrors 30 and 32.

In use of the scanner of the invention with the optical system of FIG. 2, a user energizes LED 12a and directs its output beam, in segments per the focus portion above discussed, onto bar code 52. The user then displaces the scanner toward or away from the bar code until such time as the user finds the segments of the output beam to be in positional (common plane) registry, as above discussed, to replicate the geometric configuration of the originally-generated radiant energy beam output of LED 12a.

Figure 3:
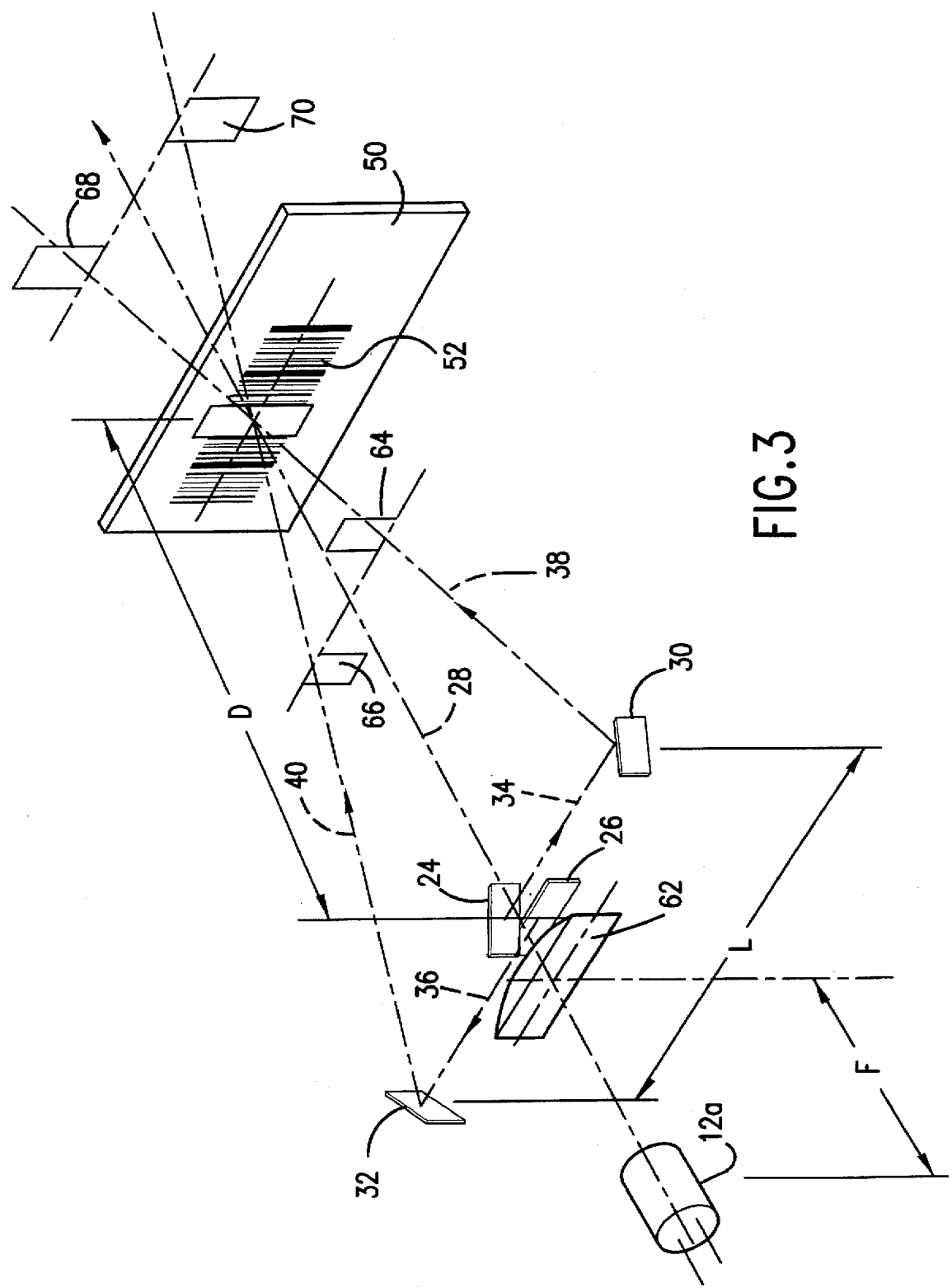
FIG. 3 shows a second embodiment of a focus portion of an optical system in accordance with the invention.

Turning to the embodiment of FIG. 3, components thereof in common with the FIG. 2 embodiment bear the same reference numerals and letters. An additional component is included, namely, cylindrical lens 62. LED 12a is disposed at the focal length (F) of lens 62 and the lens converts the circular output beam of LED 12a into a rectangular beam, which is applied to mirrors 24 and 26 in respective upper and lower half-rectangular segments. Reflective paths 38 and 40, respectively of mirrors 30 and 32, will be seen to contain smaller (64, 66) and larger (68, 70) images of the half-rectangles as distance progresses along optical axis 28. At one location along the optical axis, however, the respective upper and lower half-rectangle images will be in planar registry, i.e., at target or object plane 50, which is the focal plane of the focus portion of the optical system. A bar code 52 resident in plane 50 will accordingly be in focus for the scan portion of the optical system.

As noted above, the geometric configuration of the output beam of radiant energy source 12 is generally not of consequence. However, advantage attends the rectangularizing of the output beam. Thus, when the user moves the scanner along the optical axis to register the half segments, the user can also observe bar code alignment, e.g., horizontal disposition thereof, in that the bar code is typically itself of rectangular configuration.

Figure 5:
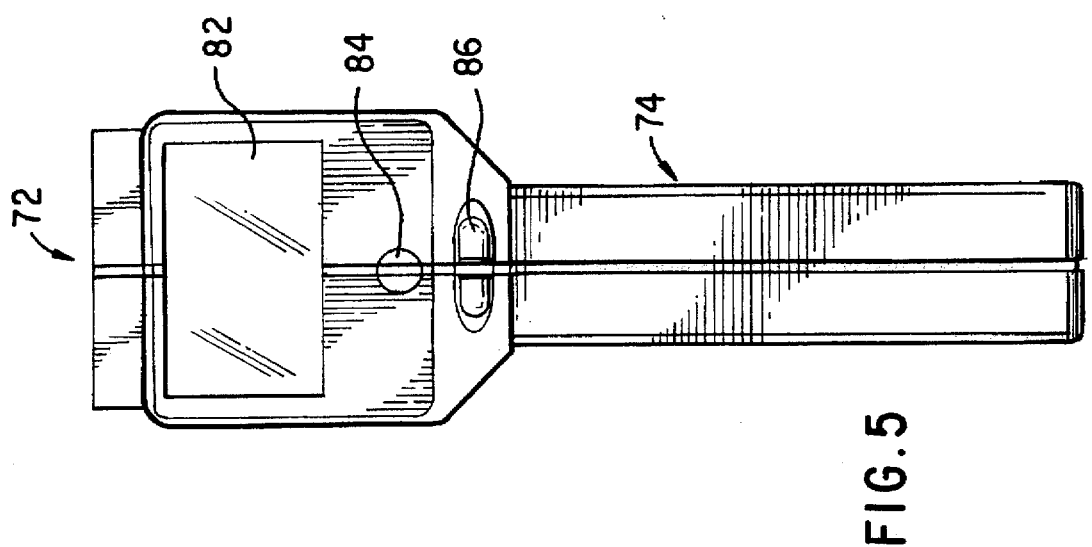
FIG. 5 is a rear elevation of the FIG. 5 scanner.
Figure 4:
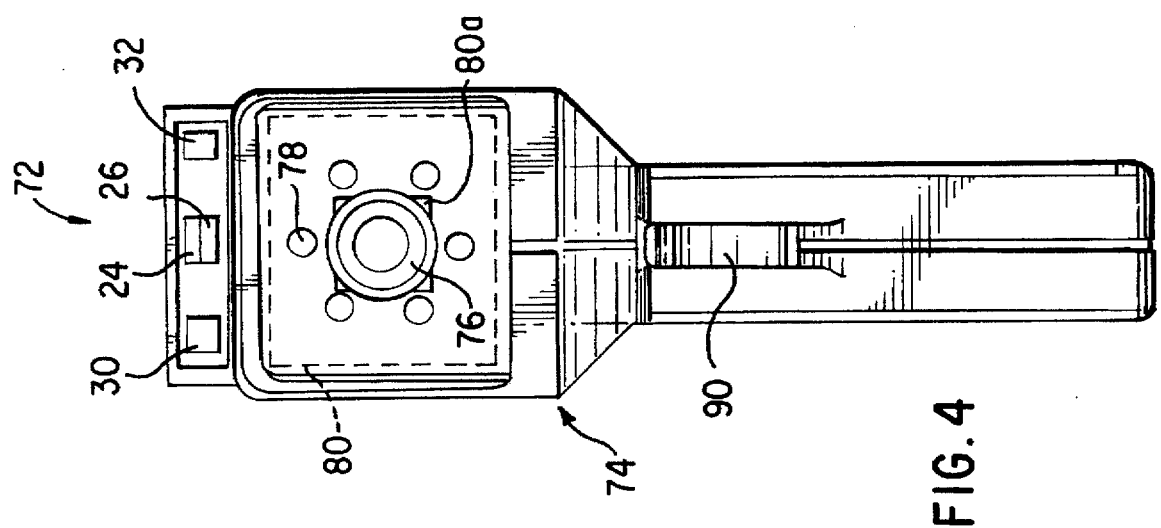
FIG. 4 is a front elevation of a hand-held scanner arrangement in which the focusing system of the invention is embodied.
Figure 6:
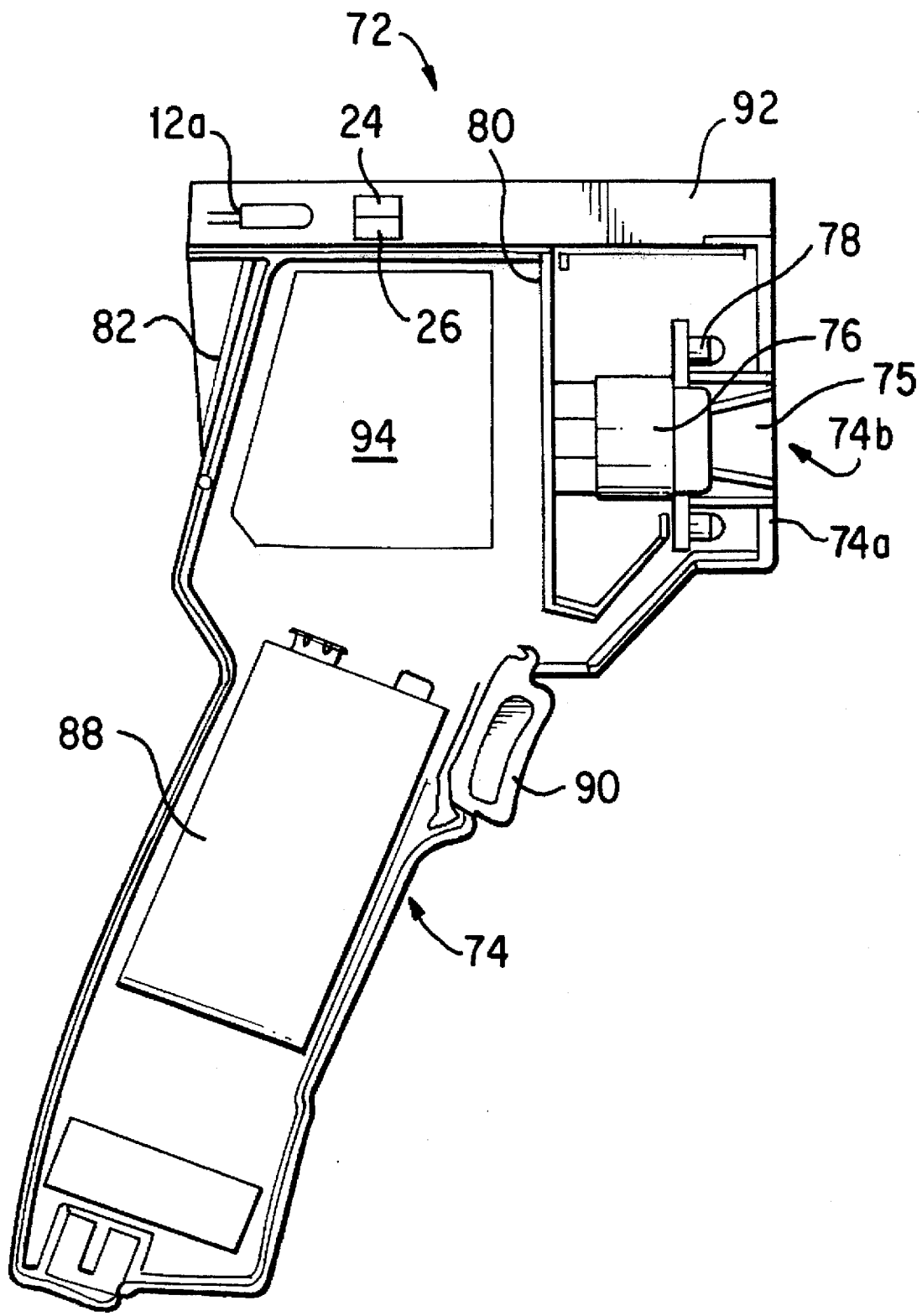
FIG. 6 is a pictorial view of interior contents of the FIG. 5 scanner.

FIGS. 4–6 illustrate a highly simplified embodiment of a bar code reader that may utilize the simplified focusing system of the invention. A reader may be implemented as a hand-held scanner 72, as illustrated, or a desk-top work station or stationery scanner. In a preferred embodiment, the arrangement is implemented in a housing 74, which may be of plastic and have separable housing halves with radiant energy exit port 74a, which may be termed an optical output funnel, and radiant energy entry port 74b, which is bounded by optical isolator 75 and may be termed an optical input funnel. Isolator 75 is an opaque member, tapering to lens 76, and serves to restrict the lens to receipt of projected radian-energy as modified by reflection thereof by the scanned bar code.

Scanner 72 is generally of the style disclosed in U.S. Pat. No. 4,760,243 issued to Swartz, et al., or in U.S. Pat. No. 4,896,026 assigned to Symbol Technologies, Inc., and also similar to the configuration of a bar code reader commercially available as part number LS 2000 from Symbol Technologies, Inc. Alternatively, or in addition, features of U.S. Pat. No. 4,387,297 issued to Swartz, et al. or U.S. Pat. No. 4,409,470 issued to Shepard, et al., both such patents assigned to Symbol Technologies, Inc., may be employed in constructing the bar code reader unit of FIG. 5. These U.S. Pat. Nos. 4,760,248, 4,896,026 and 4,409,470 are incorporated herein by reference.

Referring to FIGS. 4-6 in more detail, the segmented outgoing light beams are generated in scanner 72 and directed to impinge upon a bar code symbol disposed on a target a few inches from the front of housing 74. In a preferred embodiment, the reader unit is of a pistol-shape, i.e. having barrel and grip portions as illustrated. The focus portion of the OTCS is disposed in an uppermost cavity 92 and, as shown, the optical axis thereof extends in parallel with the barrel portion of housing 74. The various mirrors and LED thereof can be seen in FIGS. 4 and 6.

Lens 76 of the scan portion of the OTCS likewise has its optical axis disposed in parallel with the barrel portion of housing 74 and LEDs 78 are disposed circumferentially of lens 76. CCD array unit 80 includes an active portion 80(a) (FIG. 4) in registry with lens 76.

An LCD panel 82 permits visual communication of decoded symbology of scanned bar codes and other operational information as desired, for example, display of the bar code during focusing. Indicator 84 provides indications of successful scans as by issuing output light, beeping, or the like. Slider 86 is provided to control the level of excitation of LEDs 78. The scanner is powered by battery 88, disposed in the grip portion of housing 74. Pushbutton 90 is a two-stage switch actuator. In one ON position thereof, LED 12a is energized, i.e., to accomplish the focusing phase. In the other ON position of pushbutton 90, LEDs 78 are energized, i.e., to accomplish the scanning phase.

Printed circuit board 94 includes the various electronic circuitry of the scanner, particularly decoder 16 of FIG. 1, including a CPU suitably programmed for decoding of the symbology of the scanned bar code and for controlling operation of the scanner, as explained below in connection with FIG. 7.

The scanner is designed to be aimed at a bar code symbol by the user from a position in which the reader is spaced from the symbol, i.e., not touching the symbol or moving across the symbol. Typically, this type of hand-held bar code reader is specified to operate in the range of perhaps several inches.

The reader may also function as a portable computer terminal, and may include a keyboard, such as described in the previously noted U.S. Pat. No. 4,409,470.

Figure 7:
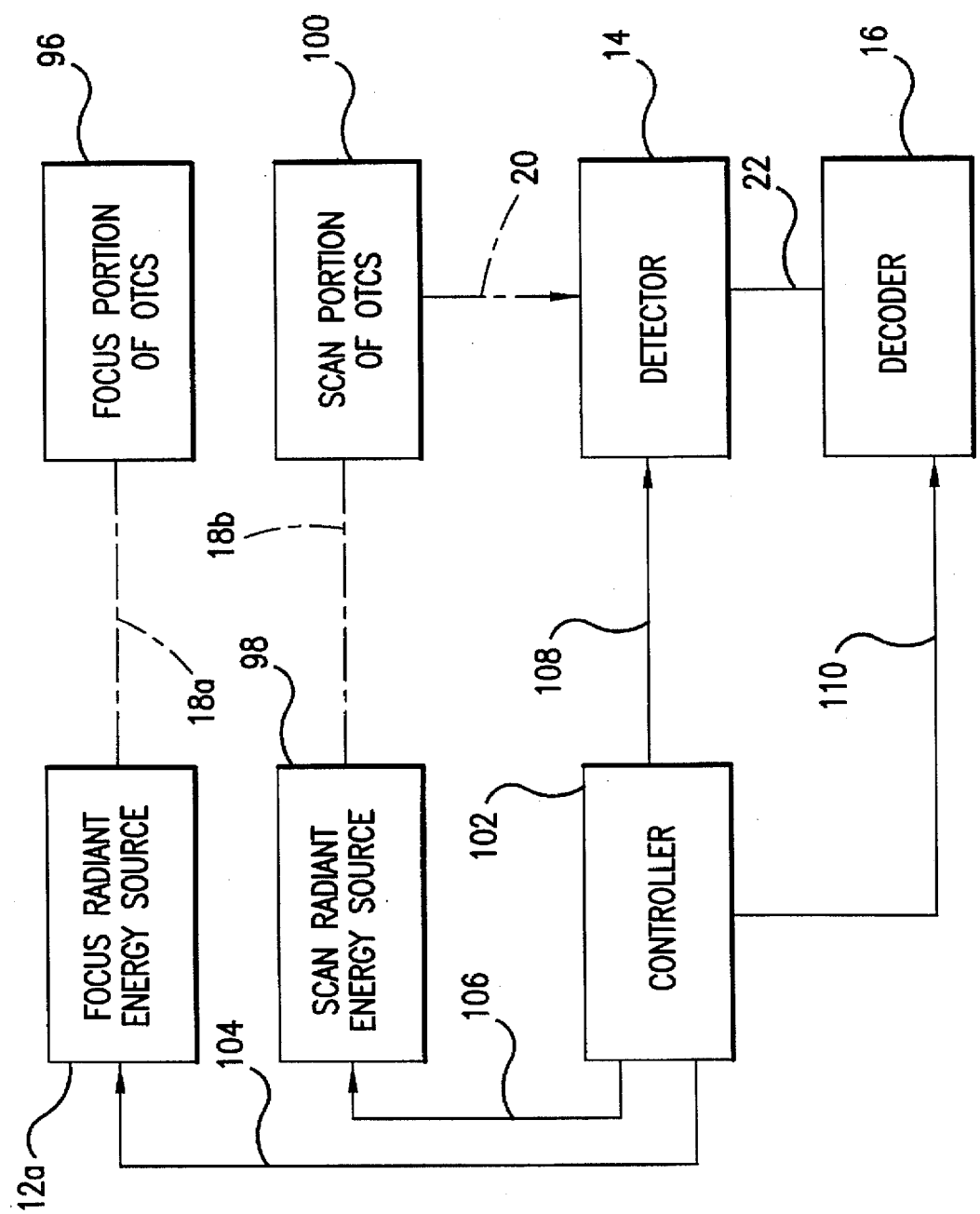
FIG. 7 is a general functional block diagram of components of the scanner of FIGS. 4–6.

Turning to FIG. 7, focus radiant energy source 12a communicates with focus portion of OTCS over optical path 18a and scan radiant energy source 98, comprised of LEDs 78 of FIGS. 4 and 6, communicates over optical path 18b with scan portion 100 of OTCS.

Controller 102 energizes source 12a over line 104, energizes source 98 over line 106, controls detector 14 over line 108 and controls decoder 16 over line 110. In terms of control sequence, source 12a is energized until focus is obtained. Then, source 98 is energized. Then, detector 14 is enabled to have its CCDs read out. Lastly, decoder 16 is enabled to decode the bar code symbology in accordance with detector 14 output signals on line 22.

Figure 8:
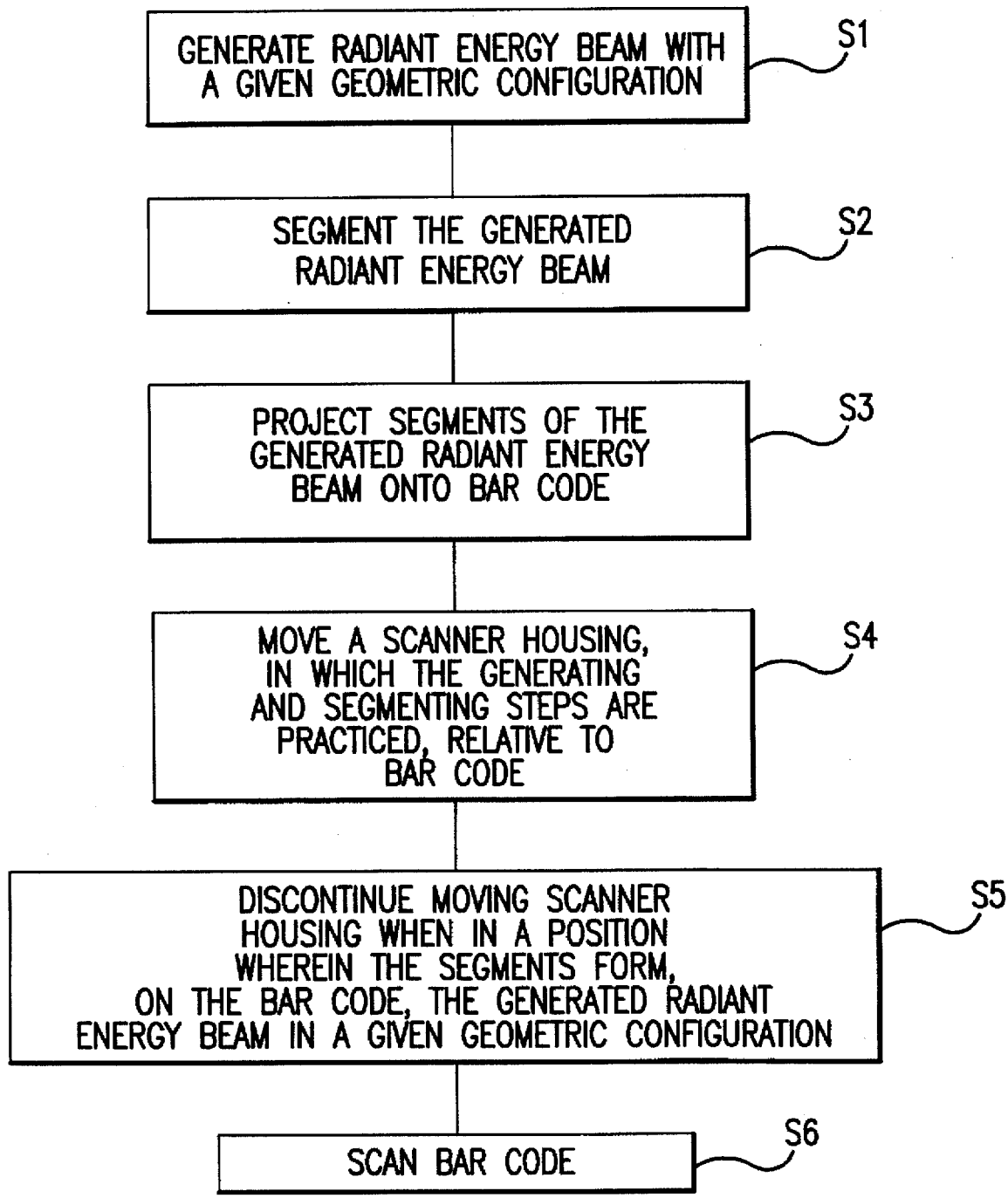
FIG. 8 is a flowchart of steps practiced in a first method afforded by the invention.

The steps of one method aspect of the invention are shown in the flow chart of FIG. 8.

In step S1, GENERATE RADIANT ENERGY BEAM WITH A GIVEN GEOMETRIC CONFIGURATION, the aforementioned circular or rectangular beam is generated.

In step S2, SEGMENT THE GENERATED RADIANT ENERGY BEAM, the generated beam is partitioned by mirrors 24 and 26 of FIGS. 2 and 3.

In step S3, PROJECT SEGMENTS OF THE GENERATED RADIANT ENERGY BEAM ONTO BAR CODE, mirrors 30 and 32 so provide.

In step S4, MOVE A SCANNER HOUSING, IN WHICH THE GENERATING AND SEGMENTING STEPS ARE PRACTICED, RELATIVE TO BAR CODE, housing 74 is advanced toward or moved backward from the bar code.

In step S5, DISCONTINUE MOVING SCANNER HOUSING WHEN IN A POSITION WHEREIN THE SEGMENTS FORM, ON THE BAR CODE, THE GENERATED RADIANT ENERGY BEAM IN GIVEN GEOMETRIC CONFIGURATION, the scanner housing is maintained stationary as the beam configuration is that of FIGS. 2 or 3 on plane 50.

In step S6, SCAN BAR CODE, an image of the in-focus bar code is supplied to CCD array active area 80a.

Figure 9:
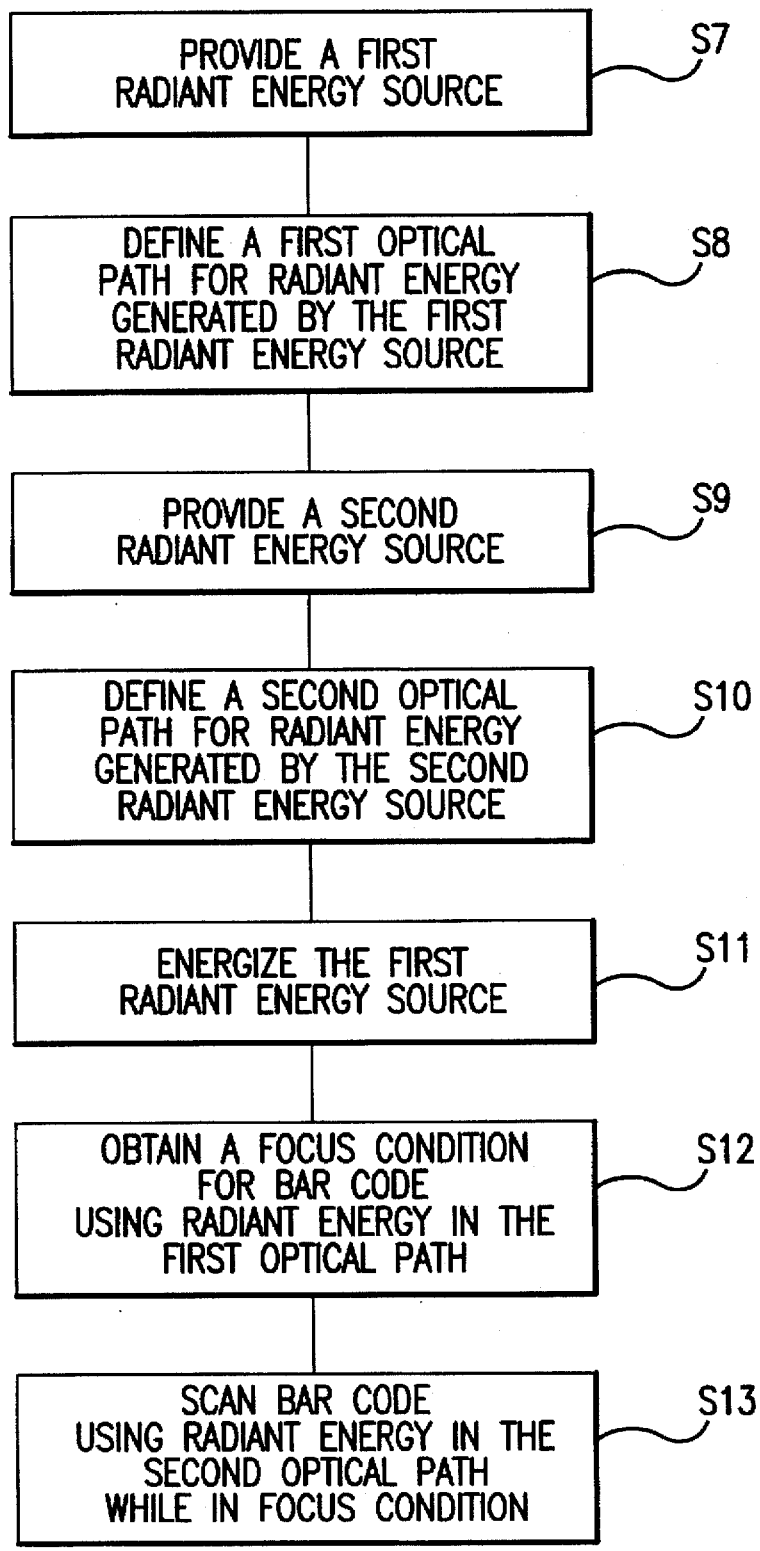
FIG. 9 is a flowchart of steps practiced in a second method afforded by the invention.

The steps of another method aspect of the invention are shown in the flow chart of FIG. 9.

In step S7, PROVIDE A FIRST RADIANT ENERGY SOURCE, LED 12a is provided.

In step S8, DEFINE A FIRST OPTICAL PATH FOR RADIANT ENERGY GENERATED BY THE FIRST RADIANT ENERGY SOURCE, an optical path for focusing purposes is defined, e.g., as by mirrors 24, 26, 30 and 32.

In step S9, PROVIDE A SECOND RADIANT ENERGY SOURCE, LEDs 78 are provided.

In step S10, DEFINE A SECOND OPTICAL PATH FOR RADIANT ENERGY GENERATED BY THE SECOND RADIANT ENERGY SOURCE, exit port 74b is provided in the scanner housing, as is lens 76 with isolation member 75.

In steps S11, ENERGIZE THE FIRST RADIANT ENERGY SOURCE, and step S12, OBTAIN A FOCUS CONDITION FOR BAR CODE USING RADIANT ENERGY IN THE FIRST OPTICAL PATH, the focus condition of FIGS. 2 or 3 is obtained by using the optical path defined as by mirrors 24, 26, 28 and 30.

In step S13, SCAN BAR CODE USING RADIANT ENERGY IN THE SECOND OPTICAL PATH WHILE IN FOCUS CONDITION, the bar code image, as illuminated by the output of LEDs 78 is conveyed to the CCD.

Figure 10:
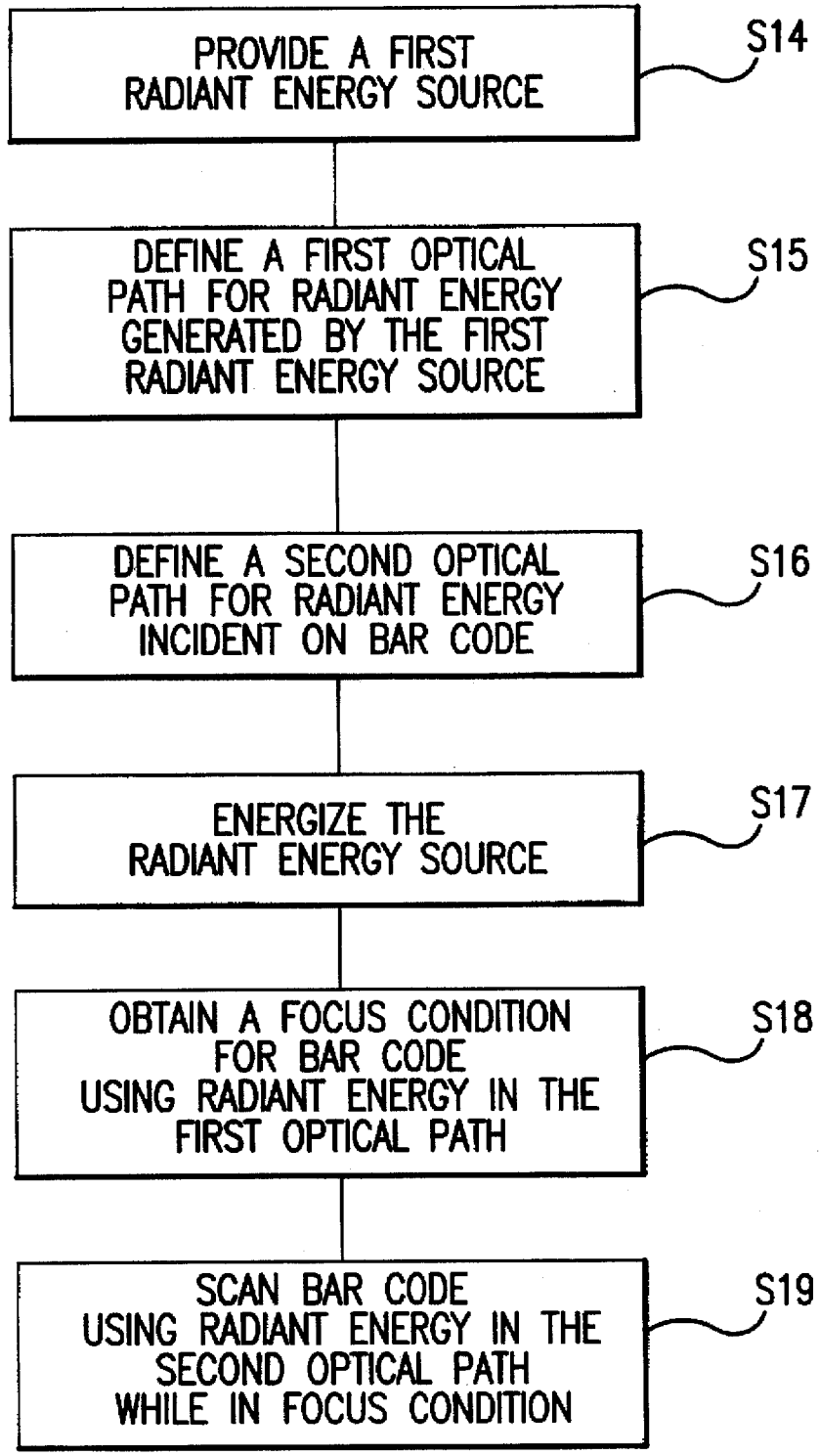
FIG. 10 is a flowchart of steps practiced in a third method afforded by the invention.

The flow chart of FIG. 10 will be seen to include steps S14 through S19, which correspond respectively to steps S7, S8 and S10 through S13, step 9 being omitted. This practice relies on ambient, environmental radiation incident on the bar code.

The radiant energy projection and collection arrangement of FIGS. 6 and 7 arranged the LED array and lens 76 in communication with a bar code through isolated optical funnels without intervening diffusion or reflection of the output beam. Preferred arrangements are now discussed in connection with FIGS. 11-14, in which showings of isolation structure are omitted, for simplicity, but may be included, as per isolation member 75 of FIGS. 6 and 7.

Figure 11:
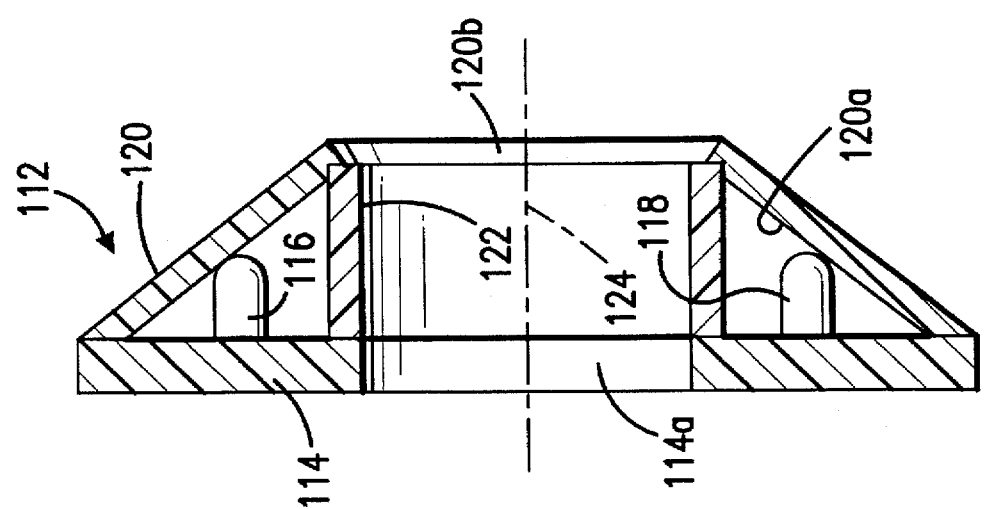
FIG. 11 is a central sectional view of a first embodiment of a bar code illumination projector for a scanner.

Referring to FIG. 11, an illumination projector or scanner optical funnel assembly 112 includes PCB 114 having central aperture 114a, with which lens 76 is placed in registry. LEDs 116 and 118 and others (not shown) are supported on PCB 114. Conical shroud member 120 is supported also by PCB 114 and includes central aperture 120b in registry with aperture 114a.

Interior surface 120a of conical shroud member 120 is treated to diffuse the LEDs' output light, for example, by zinc-white painting thereof. Diffuser ring 122 is secured between PCB 114 and conical member 120 and is disposed coaxially of optical axis 124, preferably being comprised of Delrin. High uniform illumination is achieved for the bar code upon energization of the LEDs.

Scanner optical funnel assembly 112 may be used with either a short focal length lens or an optical pinhole. The pinhole be an adjustable aperture formed as a liquid crystal plate.

Figure 12:
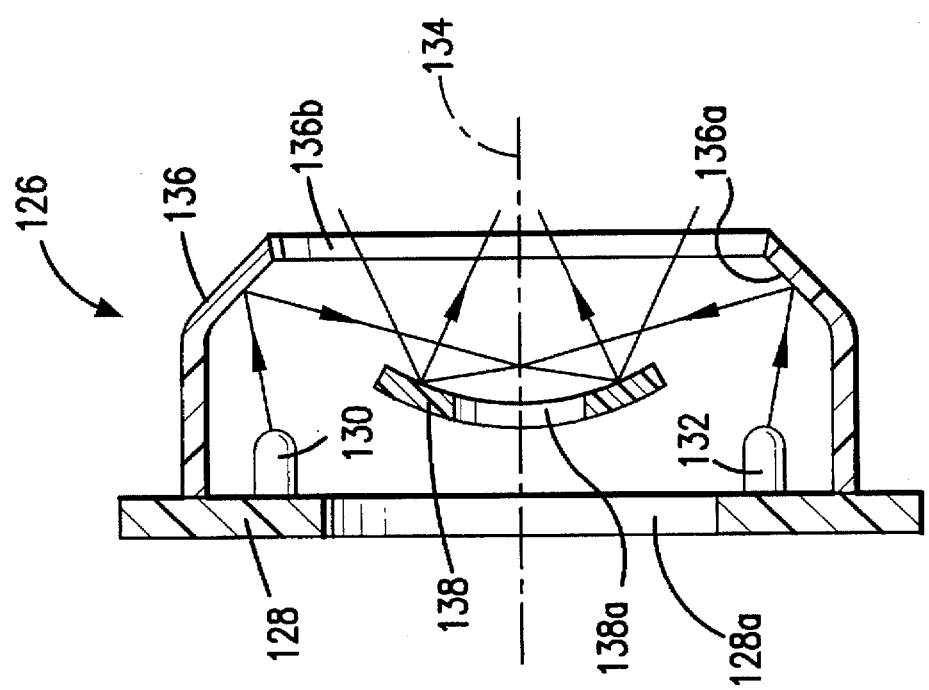
FIG. 12 is a central sectional view of a second embodiment of a bar code illumination projector for a scanner.

Referring to FIG. 12, scanner optical funnel assembly 126 includes PCB 128 having central aperture 128a, with which lens 76 is placed in registry. LEDs 130 and 132 and others (not shown) are supported on PCB 128 peripherally of optical axis 134. Shroud member 136 is supported also by PCB 128 and includes central aperture 136b in registry with aperture 128a. Interior surface 136a of shroud member 136 is treated to be positively reflective of incident light energy to reflect the same onto arcuate positively Reflective mirror 138, the central portion is apertured as indicated at 138a. Bar code illuminating light is accordingly generated and applied to a bar code upon energization of LEDs 130, 132 and the unshown LEDs mounted therewith on PCB 128. Funnel assembly 126 is particularly suitable for long range bar code reading.

Figure 14:
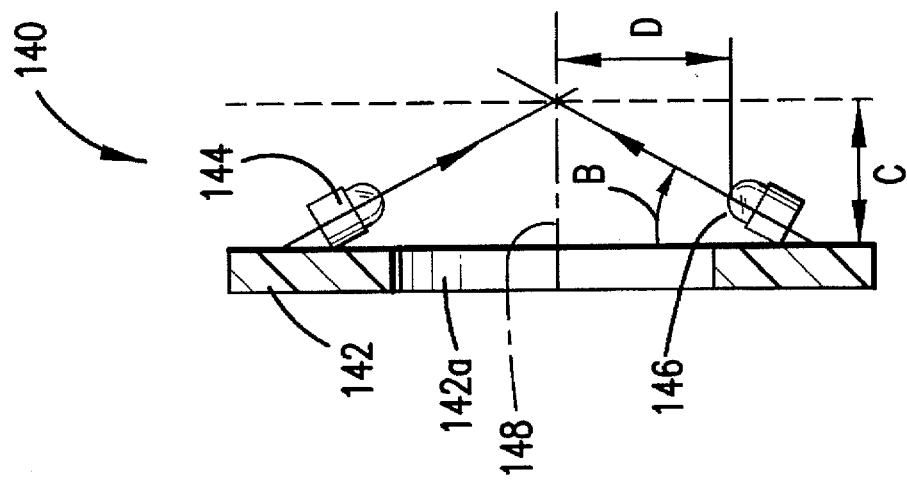
FIG. 14 is a central sectional view of the third embodiment of a bar code illumination projector for a scanner.
Figure 13:
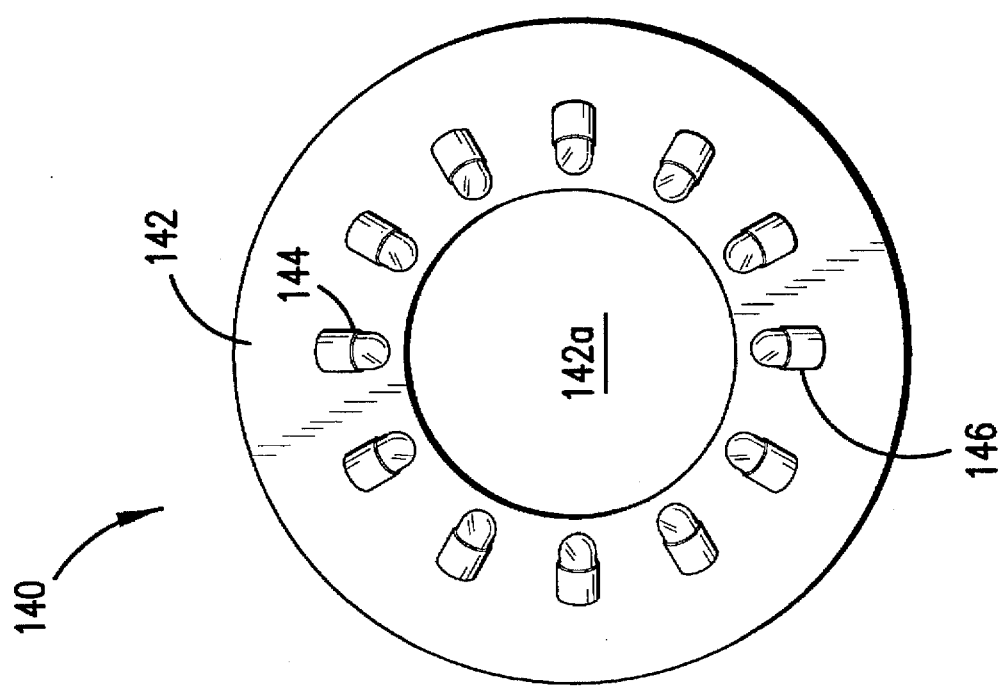
FIG. 13 is a front elevational view of third embodiment of a bar code illumination projector for a scanner.

Turning to FIGS. 13 and 14, scanner optical funnel assembly 140 includes PCB 142 having central aperture 142a, with which lens 76 is placed in registry. LEDs 144 and 146 and others (FIG. 13) are supported on PCB 142, being surface-mounted at angle B and projecting light along respective transmission axes which intersect optical axis 148. Angle B defines a plane at which the projected light is focused at a distance C, the arc tangent of B being C/D, where D is the distance between an LED and optical axis 148.

Slider 86 (FIG. 5) is positioned as desired to control the energization levels of the LEDs of the optical funnel assemblies of FIGS. 11-14. In this connection, 2-D symbols printed or etched on different substrates have different reflection and are accordingly best scannable at different scanning energy levels.

The optical funnel assemblies of FIGS. 11-14 are particularly effective for reading miniature two-dimensional symbols, e.g., laser etched marks on IC chips. They nonetheless have reading regular size bar codes and nano-symbol compatibility.

Figure 15:
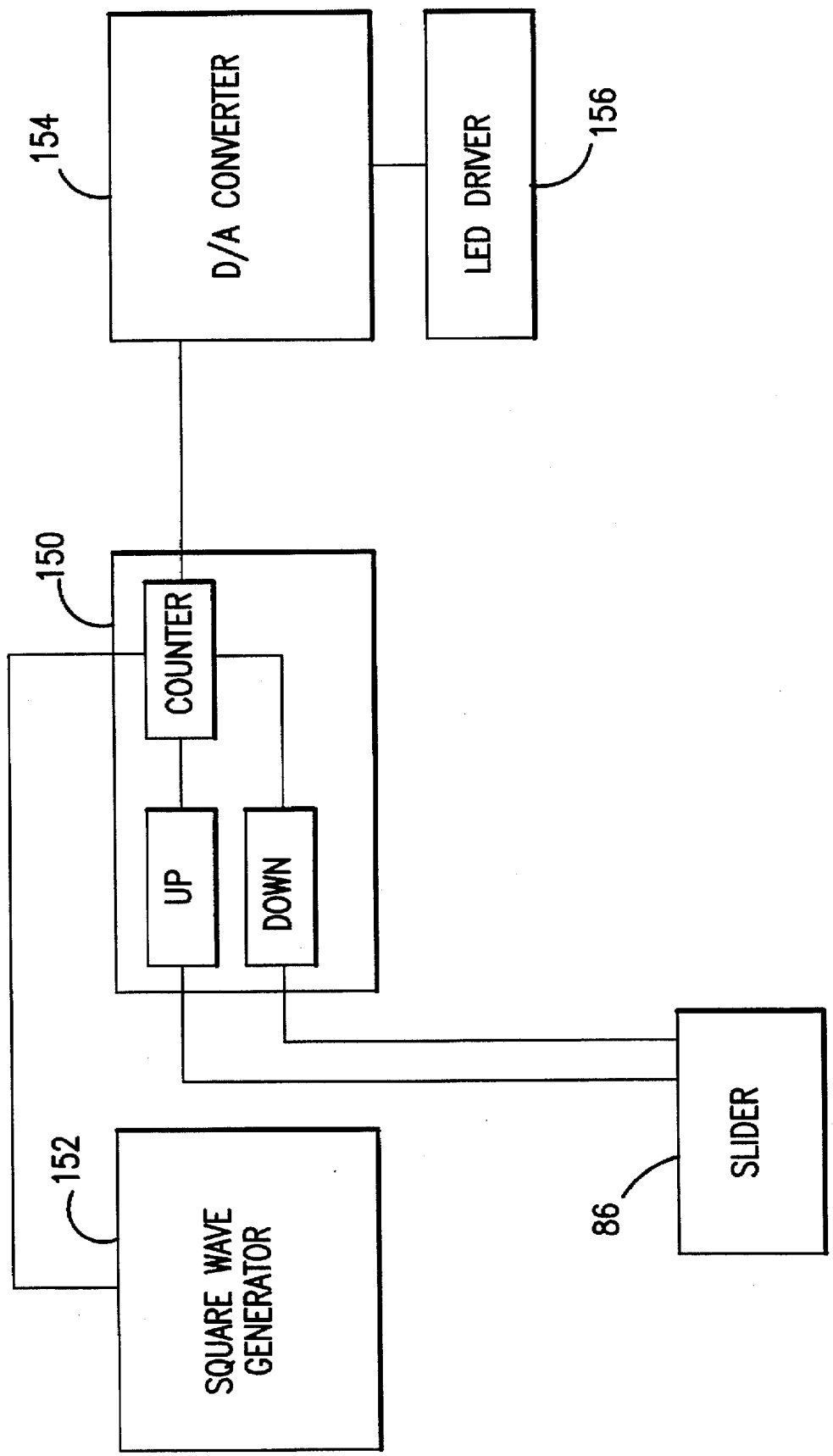
FIG. 15 is a functional block diagram of a system for control of illumination projection energy.

Turning to FIG. 15, slider 86 has a central (OFF) position and ON left and right positions, corresponding respectively with the UP and DOWN inputs to pulse counter 150. Depending on the user selection of the left and right positions for slider 86, the count state of counter 150 will be increased or decreased, based on input to the counter of the output of square wave generator 152. The output of the counter 150 is converted to analog form by D/A converter 154 and applied LED driver 156, which may be configured as an emitter-follower transistor stage, where the LEDs are connected to the transistor emitter and accordingly energized at a desired level. In this connection, the LEDs are responsive to voltage levels applied thereto to output light corresponding in intensities to the applied voltage levels.

Although the present invention has been described as aforesaid, it is not limited to such embodiments, but may also be applicable to more complex indicia scanning applications. It is conceivable that the present invention may also find application for use with various machine vision or optical character recognition applications in which information is derived from other types of indicia such as characters or from the surface characteristics of the article being scanned.

By way of summary and introduction to the ensuing claims, the invention will be seen to provide a bar code scanner comprising radiant energy source means for generating a radiant energy beam of a given configuration, detector means for generating output electrical signals indicative of radiant energy incident thereon, an optical system having a focus portion for transmitting segments of the radiant energy beam in separate optical paths extending from the scanner to a bar code to be scanned and a scan portion for collecting radiant energy transmitted by the radiant energy transmitting means as modified by the bar code and applying the same to the detector means and decoder means for decoding the output electrical signals of the detector means to provide indication of information contained in the bar code.

The focus portion of the optical system comprises first and second radiant energy reflection means respectively for reflecting the segments of the radiant energy beam into first parts of the separate optical paths. The first and second radiant energy reflection means are fixedly supported in the bar code scanner and the first parts of the separate optical paths are in alignment. The optical system has an optical axis and the first parts of the separate optical paths are orthogonal to the optical axis. The focus portion of the optical system further includes third and fourth radiant energy reflective means disposed respectively in the first parts of the separate optical paths and in radiant energy receiving relation respectively with the first and second radiant energy reflective means. The third and fourth radiant energy reflective means are fixedly supported in the bar code scanner and reflect radiant energy received respectively from the first and second radiant energy reflective means into respective second parts of the separate optical paths. The second parts of the separate optical paths intersect one another.

The scan portion of the optical system includes at least one lens and a CCD array in registry with the lens. Where bar code scanning cannot be effected in ambient light, a second LED is employed to generates radiant energy for scanning. In the hand-held scanner of FIGS. 4–6, a plurality of LEDs are disposed in circumferential relation to a single lens. Such further radiant energy is isolated from the focusing radiant energy and, indeed, is only generated after focusing has been accomplished.

The radiant energy source may issue the radiant energy beam in circular configuration and the first and second radiant energy reflective means are disposed to receive respective different half-circles of the radiant energy beam.

The radiant energy source means may also issue the radiant energy beam in rectangular configuration and the first and second radiant energy reflective means are disposed to receive respective different half-rectangles of the radiant energy beam. a cylindrical lens means is usable for converting the circular configuration radiant energy beam into rectangular configuration.

In a method aspect, the invention provides a method for bar code scanning comprising the steps of generating a radiant energy beam with a given geometric configuration, segmenting the generated radiant energy beam into segments, projecting the segments of the generated radiant energy beam onto the bar code, moving a scanner housing, wherein the generating and segmenting steps are practiced, relative to the bar code and discontinuing moving the scanner housing when it is moved into a position wherein the segments form, on the bar code, the generated radiant energy beam in its given geometric configuration. The method includes the further step of scanning the bar code when the scanner housing at the position.

In another method aspect, the invention provides a method including the steps of generating a radiant energy beam, defining a first optical path for the generated radiant energy beam, projecting the generated radiant energy beam into the first optical path, obtaining a focus condition for the bar code based on the generated radiant energy beam as projected into the first optical path, defining a second optical path for ambient, environmental radiant energy incident on the bar code and scanning the bar code in the focus condition thereof by detecting ambient, environmental radiant energy incident on the bar code in the second optical path. Alternatively, the method may be practiced by providing a radiant energy for scanning and projecting the scanning beam into the second optical path.

While several embodiments and variations of the present invention for an automatic focusing system and scanner are described in detail herein, it should be apparent that the disclosure and teachings of the present invention will suggest many alternative designs to those skilled in the art.

What is claimed is:

1. A bar code scanner comprising:
    a) a focusing energy source for generating a focusing energy beam of a given configuration;
    b) a radiant energy source for generating a radiant energy for illuminating a bar code to be scanned,
    c) a detector for generating output electrical signals indicative of said radiant energy incident thereon;
    d) an optical system having
        1) a focus portion for transmitting segments of said focusing energy beam in separate optical paths extending from said scanner to said bar code and
        2) a scan portion for collecting said radiant energy incident on said bar code and applying said collected radiant energy to said detector; and
    e) a decoder for decoding said output electrical signals of said detector to provide indication of information contained in said bar code.

2. The bar code scanner claimed in claim 1, wherein said focus portion of said optical system comprises first and second focusing energy reflection means respectively for reflecting said segments of said focusing energy beam into first parts of said separate optical paths.

3. The bar code scanner claimed in claim 2, wherein said first and second focusing energy reflection means are fixedly supported in said bar code scanner and wherein said first parts of said separate optical paths are in alignment.

4. The bar code scanner claimed in claim 3, wherein said optical system has an optical axis and wherein said first parts of said separate optical paths are orthogonal to said optical axis.

5. The bar code scanner claimed in claim 4, wherein said focus portion of said optical system further includes third and fourth focusing energy reflection means disposed respectively in said first parts of said separate optical paths and in focusing energy receiving relation respectively with said first and second focusing energy reflection means.

6. The bar code scanner claimed in claim 5, wherein said third and fourth focusing energy reflection means are fixedly supported in said bar code scanner and reflect focusing energy received respectively from said first and second focusing energy reflection means into respective second parts of said separate optical paths.

7. The bar code scanner claimed in claim 6, wherein said second parts of said separate optical paths intersect one another.

8. The bar code scanner claimed in claim 1, wherein said scan portion of said optical system includes at least one lens.

9. The bar code scanner claimed in claim 1, wherein said detector comprises a CCD array.

10. The bar code scanner claimed in claim 1, wherein said focusing energy source comprises at least one light-emitting diode.

11. The bar code scanner claimed in claim 1, wherein said focusing energy source issues said focusing energy beam in circular configuration.

12. The bar code scanner claimed in claim 1, wherein said focusing energy source issues said focusing energy beam in rectangular configuration.

13. The bar code scanner claimed in claim 11, further including lens means for converting said circular configuration focusing energy beam into rectangular configuration.

14. The bar code scanner claimed in claim 1, wherein said radiant energy source generates said radiant energy in isolation from said separate optical paths.

15. The bar code scanner claimed in claim 14, wherein said radiant energy source comprises a plurality of radiant energy generators generating said radiant energy.

16. The bar code scanner claimed in claim 14, wherein said scan portion of said optical system includes at least one lens and wherein said radiant energy generators are disposed circumferentially of said lens.

17. The bar code scanner claimed in claim 14, further including a controller for energizing said focusing energy source to provide generation of said focusing energy beam and for energizing said radiant energy source to provide for generation of said radiant energy.

18. The bar code scanner claimed in claim 1, including a housing jointly supporting said focusing energy source, said radiant energy source, said detector, said optical system and said decoder.

19. The bar code scanner claimed in claim 18, wherein said housing is of pistol-like configuration having a barrel axis, said optical system having its portions disposed along respective first and second axes parallel to said barrel axis.

20. The bar code scanner claimed in claim 19, wherein said scan portion of said optical system includes a lens disposed along said second axis.

21. The bar code scanner claimed in claim 20, wherein said radiant energy source includes radiant energy generating means for generating said radiant energy isolated from said segments of said focusing energy beam.

22. The bar code scanner claimed in claim 21, wherein said radiant energy generating means comprises a plurality of radiant energy generators supported in said housing in locations circumscribing said lens.

23. The bar code scanner claimed in claim 21, including an operating member for separately causing said radiant energy source to generate said radiant energy beam and said focusing energy source to generate said focusing energy beam.

24. The bar code scanner claimed in claim 23, wherein said operating member comprises a switch actuator disposed on said grip of said pistol-shaped housing.

25. A method for use in bar code scanning comprising said steps of:
    a) generating a focusing energy beam with a given geometric configuration;
    b) segmenting said generated focusing energy beam into segments;
    c) projecting said segments of said generated focusing energy beam onto said bar code;
    d) moving a scanner housing, in which said generating and segmenting steps are practiced, relative to said bar code; and e) discontinuing moving said scanner housing when it is moved into a position wherein said segments form, on said bar code, said generated focusing energy beam in its given geometric configuration.

26. The method claimed in claim 25, including said further step of scanning said bar code when said scanner housing is located at said position.

27. The method claimed in claim 26, wherein said scanning step is performed by transmitting onto said bar code a radiant energy generated separately from said focusing energy beam.

28. The method claimed in claim 25, wherein said given geometric configuration is selected to be circular and wherein said segments are selected to be of respective half-circles.

29. The method claimed in claim 25, wherein said given configuration is selected to be rectangular and wherein said segments are selected to be of respective half rectangles.

30. A bar code scanner comprising:
   a) a focusing energy source for generating a focusing beam of a circular configuration;
   b) a radiant energy source for generating a radiant energy for illuminating a bar code to be scanned;
   c) a detector for generating output electrical signals indicative of said radiant energy incident thereon;
   d) an optical system having
      1) a focus portion for transmitting different half-circles of said focusing beam in separate optical paths extending from said scanner to said bar code, said focus portion comprising first and second focusing energy reflection means respectively disposed to reflect said different half-circles of said focusing beam into first parts of said separate optical paths and
      2) a scan portion for collecting said radiant energy incident on said bar code and applying said collected radiant energy to said detector; and
   e) a decoder for decoding said output electrical signals of said detector to provide indication of information contained in said bar code.

31. A bar code scanner comprising:
   a) a focusing source for generating a focusing beam of a rectangular configuration;
   b) a radiant energy source for generating a radiant energy for illuminating a bar code to be scanned;
   c) a detector for generating output electrical signals indicative of said radiant energy incident thereon;
   d) an optical system having
      1) a focus portion for transmitting different half-rectangles of said focusing beam in separate optical paths extending from said scanner to said bar code, said focus portion comprising first and second focusing energy reflection means respectively disposed to reflect said different half-rectangles of said focusing beam into first parts of said separate optical paths and
      2) a scan portion for collecting radiant energy incident on said bar code and applying said collected radiant energy to said detector; and
   e) a decoder for decoding said output electrical signals of said detector to provide indication of information contained in said bar code.

32. A bar code scanner comprising:
   a) a focusing source for generating a focusing beam of a circular configuration;
   b) a radiant energy source for generating a radiant energy for illuminating a bar code to be scanned;
   c) a detector for generating output electrical signals indicative of said radiant energy incident thereon;
   d) an optical system having
      1) a lens means for converting said circular configuration radiant energy beam into rectangular configuration;
      2) a focus portion for transmitting different half-rectangles of said focusing beam in separate optical paths extending from said scanner to said bar code, said focus portion comprising first and second focusing energy reflection means respectively disposed to reflect said different half-rectangles of said focusing beam into first parts of said separate optical paths and
      3) a scan portion for collecting radiant energy incident on said bar code and applying said collected radiant energy to said detector; and
   e) a decoder for decoding said output electrical signals of said detector to provide indication of information contained in said bar code.

33. A bar code scanner for reading a bar code, said bar code scanner having a split beam focusing mechanism, said bar code scanner comprising:
   a) a single focusing energy source for generating a focusing beam of a known geometrical shape;
   b) a segmenting optical system for splitting the geometrical shape of said focusing beam into at least two beam segments; and
   c) a transmitting optical system for recomposing said beam segments at a predetermined distance away from the scanner.

34. A bar code scanner of claim 33, wherein the geometrical shape of said focusing beam is a circle.

35. A bar code scanner of claim 33, wherein the geometrical shape of said focusing beam is a rectangle.

* * * * *